United States Patent [19]
Onda

[11] Patent Number: 5,923,907
[45] Date of Patent: Jul. 13, 1999

[54] FINDER UNIT

[75] Inventor: Kazuhiko Onda, Saitama, Japan

[73] Assignee: Fuji Photo Optical Co., Ltd., Saitama, Japan

[21] Appl. No.: 08/991,643

[22] Filed: Dec. 16, 1997

[30] Foreign Application Priority Data

Dec. 17, 1996 [JP] Japan .................................. 8-337079

[51] Int. Cl.⁶ .................................................. G03B 13/10
[52] U.S. Cl. ............................................. 396/79; 396/84
[58] Field of Search ........................... 396/84, 379, 382, 396/148, 79, 106

[56] References Cited

U.S. PATENT DOCUMENTS

| | | | |
|---|---|---|---|
| 4,944,030 | 7/1990 | Haraguchi et al. .................. | 354/403 |
| 5,083,146 | 1/1992 | Ueda .................................. | 396/379 |
| 5,321,454 | 6/1994 | Mogiyama ......................... | 396/379 |
| 5,778,262 | 7/1998 | Kobayashi et al. ................ | 396/84 |

*Primary Examiner*—W. B. Perkey
*Attorney, Agent, or Firm*—Leydig, Voit & Mayer, Ltd.

[57] ABSTRACT

In a finder unit of the present invention, a cam plate for changing the magnification of a finder optical system is arciform and is, when disposed on a lens barrel on a camera, movable along the cylindrical lens barrel's outer periphery. Consequently, the finder unit can easily be incorporated into the camera, and contributes to reducing the size of the camera.

17 Claims, 3 Drawing Sheets

FINDER UNIT

BACKGROUND OF THE INVENTION

1. Field of the Invention

The present invention relates to a finder unit constituting a part of a camera and, in particular, to a finder unit having an adjustable visual field range.

2. Related Background Art

Recently under development are small-sized cameras which are highly portable. An example of such small-sized cameras is one in which a cylindrical lens barrel for forming an image of an object on a film can be accommodated in the main body of the camera. In such a camera, it is necessary to appropriately adjust the visual field range of a finder in response to reduction and enlargement of the photographing angle of view as the lens barrel is extended and collapsed (retracted after extended). Accordingly, such a camera incorporates therein an apparatus for adjusting the visual field range of the finder in synchronization with the extending and collapsing operations of the lens barrel.

An example of such a camera is disclosed in U.S. Pat. No. 4,944,030.

SUMMARY OF THE INVENTION

It is an object of the present invention to provide a finder unit which can easily be incorporated in a camera, while allowing the camera to have a smaller size.

The present invention provides a finder unit, which is to be incorporated in a camera equipped with a cylindrical lens barrel, comprising a finder optical system and a cam plate for changing a magnification of the finder optical system, in which the cam plate is arciform and, when disposed on the lens barrel on the camera, movable along the lens barrel's outer periphery.

In accordance with the finder unit of the present invention, when the cam plate is disposed on the lens barrel on the camera, while the cam plate moves along the outer periphery of the cylindrical lens barrel, the magnification of the finder optical system is changed by the cam plate, whereby the visual field range of the finder is adjusted.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

In the following, a preferred embodiment of the present invention will be explained in detail with reference to FIGS. 1 to 3.

Figure 1:
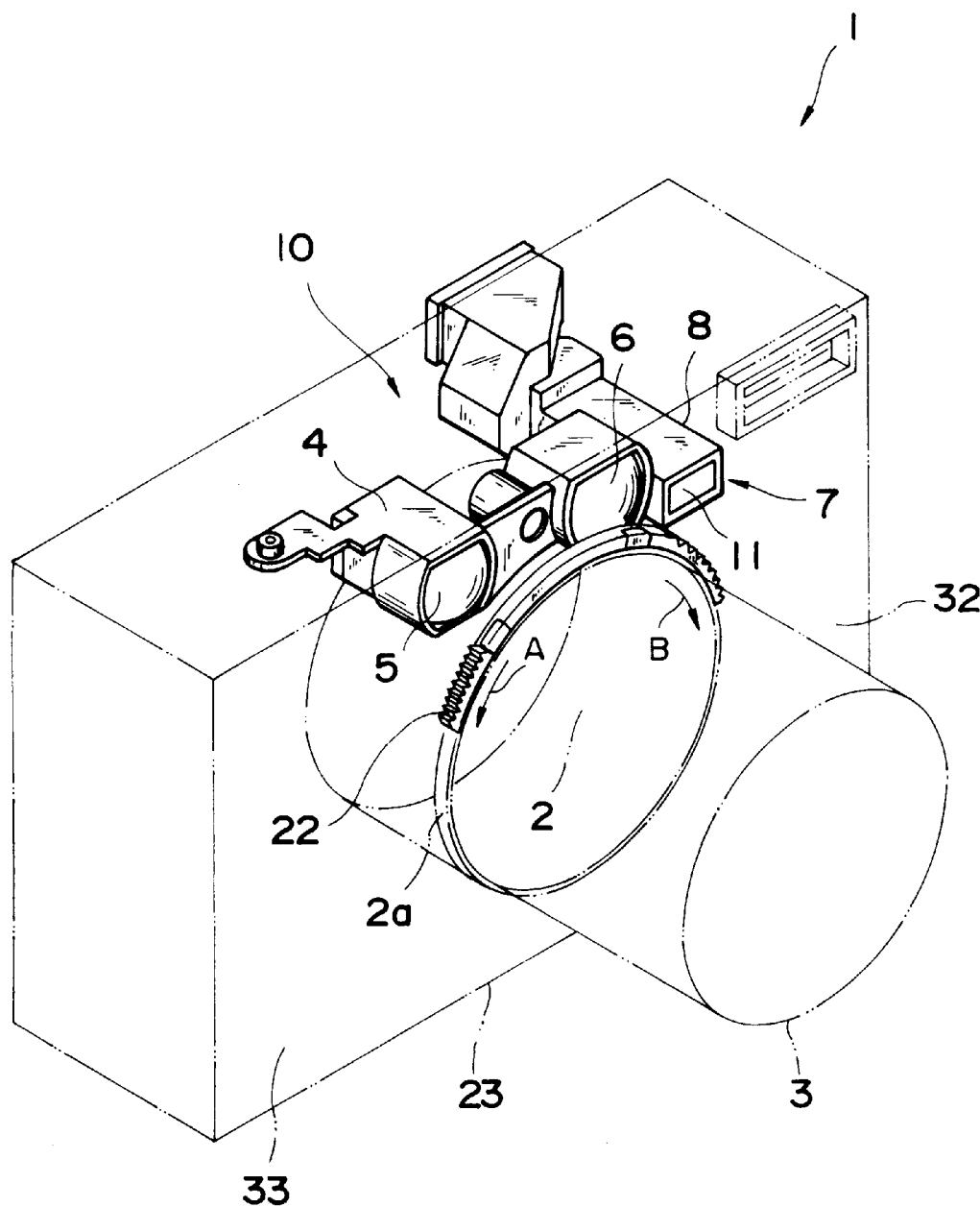
FIG. 1 is a perspective view showing a preferred embodiment of the finder unit in accordance with the present invention.

FIG. 1 is a perspective view showing the appearance of a camera capable of zooming, to which the finder unit of the present invention is applied. As depicted, this camera 1 has a camera main frame 23 which forms a film take-up section 32 and a cartridge-accommodating section 33 respectively on the left and right sides as viewed from its front side. A cylindrical lens barrel frame 2 is disposed between the film take-up section 32 and the cartridge-accommodating section 33. Above the lens barrel frame 2, a finder unit 10 for adjusting the visual field range of the finder is secured to the camera main frame 23. The finder unit 10 has a finder unit main frame 4, to which an AF light-projecting section 5 and an AF light-receiving section 6 are attached. The AF light-projecting section 5 and the AF light-receiving section 6 constitute a distance-measuring unit which measures the distance from the camera 1 to an object using the principle of triangulation, and its result is utilized for autofocus (AF) control.

On the front side of the finder unit main frame 4, below the AF light-projecting section 5 and the AF light-receiving section 6, an arc gear 22, which is concentric with the lens barrel frame 2, is attached to the finder unit main frame 4 so as to be circumferentially movable to-and-fro. The arc gear 22 is disposed so as to be slidable on and along the front end portion of an outer periphery 2a of the lens barrel frame 2, and can be moved to-and-fro by a rotary motor and a gear train (not depicted) placed within the camera main frame 23. On the other hand, a cylindrical lens barrel 3 is disposed such that it can be accommodated within the lens barrel frame 2. In the case where the arc gear 22 is rotated counterclockwise (in the direction of arrow A in FIG. 1) as viewed from the front side, the lens barrel 3 is extended forward from the lens barrel frame 2 so as to perform telephoto photographing. In the case where the arc gear 22 is rotated clockwise (in the direction of arrow B in FIG. 1), by contrast, the lens barrel 3 is collapsed into the lens barrel frame 2 so as to effect normal photographing. As the lens barrel 3 is thus extended and collapsed, the photographing angle of view is reduced and enlarged. The configuration of such lens barrel 3, AF light-projecting section 5, and AF light-receiving section 6 are disclosed, for example, in U.S. Pat. No. 4,944,030, all the contents of which are incorporated herein by reference.

Also, the finder unit main frame 4 is provided with a finder section 7. The finder section 7 is constituted by a hollow finder-accommodating section 8 having openings (not depicted) respectively on the front and rear sides of the camera 1, and a finder optical system 9 accommodated within the finder-accommodating section 8. The finder optical system 9 comprises an objective lens 11 disposed at the front-side opening of the finder-accommodating section 8 (see FIG. 1) and an eyepiece 12 disposed at the rear-side opening of the finder-accommodating section 8. Also, as shown in FIG. 2, along an optical axis L indicated by a chain line between the objective lens 11 and the eyepiece 12, a first movable lens 13, a second movable lens 14, a prism 15, a visual field frame 16, a mask 17, and a prism 18 are successively disposed from the side of the objective lens 11.

The first movable lens 13 and the second movable lens 14 face each other. The first and second movable lenses 13 and 14 respectively have cylindrical guides 13a and 14a, through which a guide rod 19 secured to the finder-accommodating section 8 passes. Further, the guide 13a is provided with a hook 13c, and the guide 14a is provided with a hook (not depicted). Hung between these hooks is a tension spring 21. Consequently, the first and second movable lenses 13 and 14 can be moved along the optical axis L between the prism 15 and the objective lens 11, while appropriately changing the distance therebetween. Also, the guides 13a and 14a are respectively provided with driven pins 13b and 14b.

Figure 2:
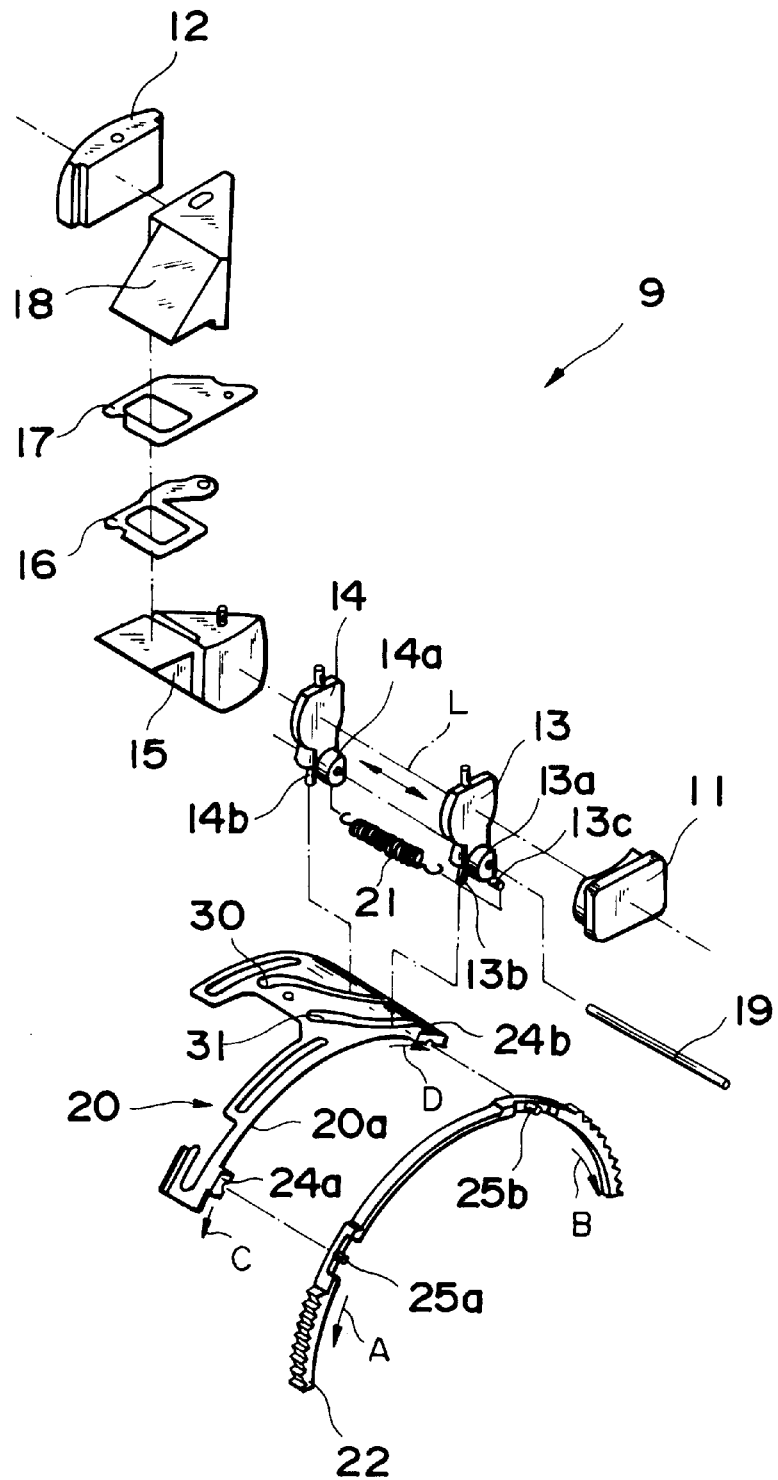
FIG. 2 is an exploded perspective view showing a main part of the finder unit.

Further, as shown in FIG. 2, the finder unit main frame 4 is provided with an arciform cam plate 20 having a curvature substantially the same as that of the arc gear 22. The cam plate 20 has an inner periphery 20b with a curvature substantially the same as that of the outer periphery 2a of the lens barrel frame 2, and is concentric with the lens barrel frame 2. The cam plate 20 has a pair of hooks 24a and 24b disposed with an appropriate distance therebetween at its circumferential edge portion 20a. On the other hand, the arc gear 22 is provided, along its circumference, with a pair of protrusions 25a and 25b disposed with a distance therebetween identical to that between the hooks 24a and 24b. As the hooks 24a and 24b engage with their corresponding protrusions 25a and 25b, the cam plate 20 is secured to the arc gear 22. Through the arc gear 22, the cam plate 20 is synchronized with the operation of the lens barrel 3.

Figure 3:
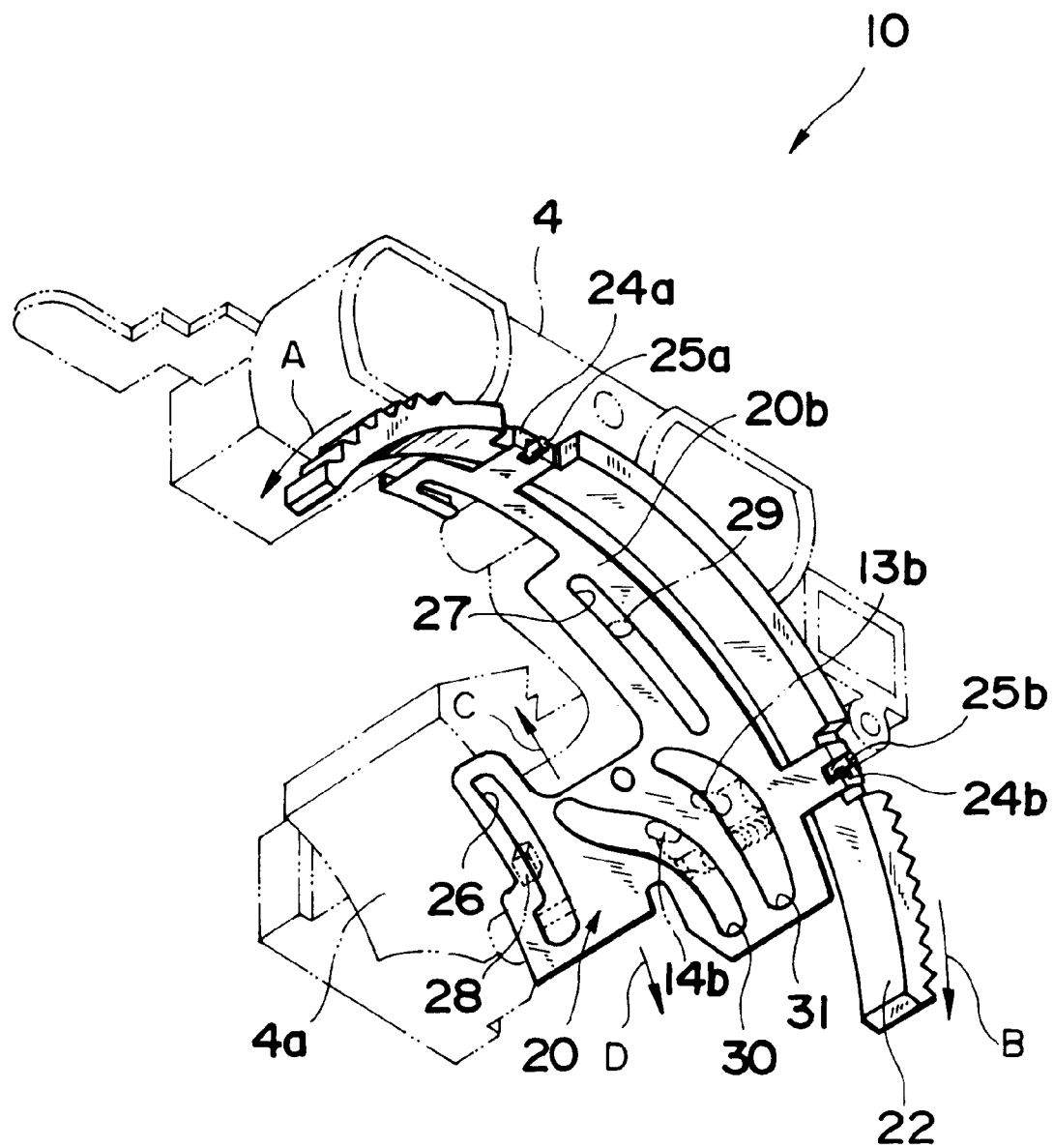
FIG. 3 is a perspective view showing a positional relationship between a finder unit main frame and a cam plate.

As shown in FIG. 3, the cam plate 20 has first and second guide holes 26 and 27 extending along the circumference of its inner periphery 20b. An L-shaped hook 28 projecting from a circumferential lower surface 4a of the finder unit main frame 4 engages with the cam plate 20 through the first guide hole 26, and a protrusion 29 projecting from the circumferential lower surface 4a of the finder unit main frame 4 passes through the second guide hole 27, whereby the cam plate 20 is securely moved along its circumference. Here, for example, the cam plate 20 is disposed along the outer periphery of the lens barrel 3 with the lens barrel frame 2 interposed therebetween and circumferentially movable around the outer periphery 2a of the lens barrel frame 2.

The cam plate 20 is formed with cam holes 30 and 31. The driven pin 14b of the second movable lens 14 engages with the cam hole (first cam hole) 30, whereas the driven pin 13b of the first movable lens 13 engages with the cam hole (second cam hole) 31. The cam holes 30 and 31 extend obliquely with respect to the moving direction of the cam plate 20 (direction of arrow C or D in FIG. 2), so that the distance therebetween gradually changes along the moving direction of the cam plate 20. Consequently, as the cam plate 20 circumferentially moves to-and-fro, the first and second movable lenses 13 and 14 move along the optical axis L, while changing the distance therebetween, thus varying the magnification of the finder optical system 9. As a result, the visual field range is appropriately adjusted.

In the following, the operation of the thus configured finder unit 10 will be explained.

In FIG. 3, when the rotary motor (not depicted) is actuated upon a zooming operation of the camera 1, its rotary driving force is transmitted to the arc gear 22 through the gear train (not depicted). Then, as the arc gear 22 moves circumferentially along the outer periphery of the lens barrel 3 (in the direction of arrow A or B in FIG. 1), the cam plate 20 moves circumferentially along the outer periphery of the lens barrel 3 (in the direction of arrow C or D in FIG. 2). In this manner, the cylindrical form of the lens barrel 3 is utilized in the finder unit 10, so that the lens barrel 3 is circumferentially moved to-and-fro along its outer periphery as the arc gear 22 is moved. Consequently, within the narrow space between the film take-up section 32 and the cartridge-accommodating section 33, the cam plate 20 can secure a sufficient movable width circumferentially as compared with a conventional flat cam plate of the same length. As a result, the limited narrow space within the camera 1 can effectively be utilized, which contributes to reducing the size of the camera 1.

As the cam plate 20 circumferentially moves along the outer periphery of the lens barrel 3, the first and second movable lenses 13 and 14 of the finder optical system 9 move linearly along the optical axis L, whereby the visual field range is adjusted. Here, the visual field range of the finder substantially coincides with a range corresponding to the photographing angle of view.

Also, in the case where the finder unit 10 is to be incorporated with the camera main frame 23, such incorporation becomes easy since the cam plate 20 is attached to the finder unit main frame 4 beforehand. Namely, in the finder unit 10 configured as mentioned above, the cam plate 20 may be attached to the camera main frame 23. In this case, however, an operation for engaging minute parts such as the driven pins 13b and 14b with their corresponding cam holes 30 and 31, for example, would be necessary when the finder unit 10 is being incorporated into the camera 1, thus greatly deteriorating productivity. In the finder unit 10 of this embodiment, by contrast, the cam plate 20 is attached to the finder unit main frame 4 beforehand, thus making the above-mentioned operation unnecessary. As a result, productivity is improved, thereby making it easier to incorporate the finder unit 10 into the camera 1.

Further, in the case where the cam plate 20 is to be attached to the camera main frame 23 as mentioned above, the visual field ratio, parallax, and the like cannot be determined unless the finder unit 10 is securely fixed to the camera main frame 23 at the time when the camera 1 is made. Accordingly, in the event that there is a defect in the finder unit 10, an operation for replacing the finder unit 10 or the like will be necessary. In the finder unit 10 of this embodiment, by contrast, since the cam plate 20 is attached to the finder unit main frame 4 beforehand, the visual field ratio, parallax, and the like can be determined in the finder unit 10 alone, whereby productivity can further be improved.

The present invention should not be restricted to the above-mentioned embodiment. For example, though the finder unit 10 is applied to a camera having a lens barrel frame 2 in which the cam plate 20 is moved along the outer periphery 2a of the lens barrel frame 2 in the above-mentioned embodiment, the finder unit 10 may be applied to a camera which does not have a lens barrel frame 2. In this case, the finder unit 10 may be moved along the outer periphery of a lens barrel 3, thereby yielding effects similar to those of the finder unit 10 in the above-mentioned embodiment.

As explained in the foregoing, the finder unit in accordance with the present invention is effective in that it can easily be incorporated into a camera, while allowing the camera to have a smaller size.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A finder unit to be incorporated in a camera equipped with a cylindrical lens barrel, said finder unit comprising:

a finder unit main frame adapted for mounting on a main frame of said camera;

a finder optical system attached to said finder unit main frame; and an arciform cam plate for changing a magnification of said finder optical system connected to said finder unit main frame in a manner enabling said cam plate to move with respect to said finder unit main frame in a circumferential direction of said cam plate.

2. A finder unit according to claim 1, wherein said cam plate is, when disposed on the cylindrical lens barrel on the camera, circumferentially movable around the cylindrical lens barrel's outer periphery.

3. A finder unit according to claim 2, wherein said cam plate has an inner periphery with a curvature substantially the same as that of the cylindrical lens barrel's outer periphery and, when disposed on the cylindrical lens barrel on the camera, concentric with the cylindrical lens barrel.

4. A finder unit according to claim 1, further comprising an arc gear with a curvature substantially the same as that of said cam plate, said arc gear being attached to said cam plate, said cam plate synchronizing through said arc gear with an operation of said lens barrel.

5. A finder unit according to claim 4, wherein said finder optical system comprises first and second movable lenses facing to each other, said first and second movable lenses having a distance therebetween changing as said cam plate moves, thereby varying the magnification of said finder optical system.

6. A finder unit according to claim 5, wherein said cam plate has first and second cam holes, said first and second movable lenses respectively engaging with said first and second cam holes.

7. A finder unit according to claim 6, wherein said first and second movable lenses are connected to each other by a tension spring.

8. A finder unit according to claim 1, wherein said cam plate is movably connected to said finder unit main frame and includes a first guide hole extending in a circumferential direction of said cam plate, and said finder unit main frame includes a hook engaging said first guide hole and movable therein in the circumferential direction of said cam plate.

9. A finder unit according to claim 8, wherein said finder optical system includes first and second movable lenses facing each other, a distance between said first and second movable lenses changing as said cam plate moves to vary a magnification of said finder optical system.

10. A finder unit according to claim 9, wherein said first and second movable lenses respectively engage first and second cam holes in said cam plate.

11. A finder unit according to claim 10, wherein said cam plate includes a second guide hole extending in the circumferential direction of said cam plate and said finder unit main frame includes a projection passing through said second guide hole.

12. A finder unit according to claim 11, including a tension spring connecting said first and second movable lenses to each other.

13. A finder unit according to claim 12, further comprising an arc gear attached to said cam plate and having a curvature substantially the same as that of said cam plate, movement of said cam plate being synchronized through said arc gear with movement of said lens barrel.

14. A finder unit according to claim 13, wherein said arc gear is provided with a pair of protrusions, said cam plate has a pair of hooks disposed at a circumferential edge portion of said cam plate, and said cam plate is secured to said arc gear by engagement between said hooks and said protrusions.

15. A finder unit according to claim 14, wherein said arc gear is movably disposed around the outer periphery of said lens barrel and moves synchronously with movement of said lens barrel when said finder unit is attached to said main frame of said camera.

16. A finder unit according to claim 1, wherein said finder unit main frame and said cam plate can be mounted on said main frame of said camera as a unit.

17. A finder unit according to claim 1, wherein a visual field ratio of said finder unit can be determined before said finder unit is mounted on said main frame of said camera.

* * * * *